PAPER FOR USE WITH A FORMULA FOR MEASURING LUMBER

Filed Aug. 26, 1966

THE KUSLER FORMULA:

$$\frac{144}{ESA} = L11BF$$

12 SYMBOLS:

- ESA — END SURFACE AREA
- SI — SQUARE INCHES
- L11BF — LENGTH INCHES ONE BOARD FOOT
- L — LENGTH IN INCHES ONLY
- SL — STATED LENGTH IN FEET ONLY
- BF — BOARD FEET
- BF1P — BOARD FEET ONE PIECE
- TBF — TOTAL BOARD FEET
- BM — BILL MATERIAL
- NP — NUMBER PIECES
- PM — PRICE PER THOUSAND
- C — COST

BM  804  24  15  196

$$ESA = 8\frac{ST}{I} / 144 \quad \frac{18}{144} = L11BF$$

$$\frac{10}{12} = 1\frac{1}{2} \text{ OR } \frac{3}{2}, \quad \frac{5}{15} \div \frac{2}{3} = 10 \text{ BF1P}$$

```
BM   804  NP
     10  BF1P
    8040 TBF
    $196 PM
    48240
    72360
    8040
 $1575.840  C   (DECIMAL 3 PLACES FOR THOUSANDS)
```

RULE 1. IF YOU HAVE MORE THAN 12 INCHES IN L, YOU HAVE LESS BF THAN IN THE SL.
RULE 2. IF YOU HAVE LESS THAN 12 INCHES IN L, YOU HAVE MORE BF THAN IN THE SL.
RULE 3. IF YOU HAVE 12 INCHES IN L, YOU HAVE THE SAME NUMBER OF BF AS IN THE SL.

---

IF YOU HAVE LUMBER THAT IS 6/4 YOU ADD 50% TO THE TOTAL NUMBER OF BF. FRACTIONS CAN BE WORKED PERFECTLY.

12 IS THE UNIT:

FOR EXAMPLE TAKE AN 8 9

$$2"\frac{SI}{144} \quad \frac{L17 BF}{}$$

$$72\frac{SI}{144}$$

YOU DIVIDE 2 INTO 12 EQUALS 6 OR YOU THEN HAVE 6 TIMES MORE LUMBER THAN IN THE SL

BM  296  8  9  14  202

YOU NOW WOULD HAVE  84  BF1P

IF YOU HAVE LARGE TIMBER GIVEN IN FEET, SUCH AS  2'  YOU THEN

MULTIPLY  24 x 24 = 576 SI; AND

YOU PUT $\frac{144}{576} = \frac{1}{4}"$ IN L OR L11BF.

YOU CAN ALSO TAKE IT IN FEET, SUCH AS AN ENORMOUS TIMBER.

10'  8'

THIS EQUALS 80 SF OR $\frac{1}{80}$ OF AN INCH TO EQUAL ONE BF.

INVENTOR
CALVIN J. KUSLER

United States Patent Office 3,423,108
Patented Jan. 21, 1969

3,423,108
PAPER FOR USE WITH A FORMULA FOR
MEASURING LUMBER
Calvin J. Kusler, 1113 4th Ave. W.,
Kalispell, Mont. 59901
Filed Aug. 26, 1966, Ser. No. 575,453
U.S. Cl. 283—44     1 Claim
Int. Cl. G09b 23/02

ABSTRACT OF THE DISCLOSURE

A paper including a formula for measuring lumber wherein the length is gotten for one board foot of lumber by division of the board feet per one piece and the total board feet, the formula being imprinted upon the paper which is centrally folded and having a series of struck out arrows along the fold line so as to identify portions of text also imprinted upon the paper, the text including also symbols and rules.

---

This invention relates generally to methods for measuring lumber.

The principal object of the present invention is to provide a novel formula whereby lumber may be measured.

Another object of the present invention is to provide a lumber measuring formula wherein the length is gotten for one board foot of lumber by division, the board feet per one piece, and the total board feet.

Another object is to provide a formula for measuring lumber which includes the getting of the number of inches to equal one board foot of lumber, getting the number of board feet in each piece, and getting the total number of board feet.

Yet another object of the present invention is to provide a lumber measuring formula which includes a set of several rules which are applicable when there are more or less than twelve inches of board length.

Other objects are to provide a formula for measuring lumber which is relatively simple, easy to use and efficient in operation.

These and other objects will be readily evident upon a study of the following specification and accompanying drawing wherein:

The figure represents a diagram including the formula, a plurality of symbols used with the formula, a set of rules and other practical data.

Referring now to the drawing in detail, the numeral 10 represents a formula for measuring lumber according to the present invention. The formula 10 comprises a fraction wherein the numerator has a figure of 144 and a denominator with the letters "ESA," and wherein the fraction is followed by an equal sign after which there is the following symbol "LI1BF." It is to be noted that the denominator in the fraction represents the term "End Surface Area." It is to be further noted that the term after the equal sign represents the length in inches of one board foot. Thus with this specific formula a person may readily measure lumber.

In order that the formula may be readily presented to laymen for practical purposes, the same could be imprinted upon a sheet of paper 11 and whereon there could be imprinted various other information that would be helpful to the layman so that he might properly work the formula. Thus, as shown in the drawing, a series of 12 symbols 12 are shown and after each symbol an explanation 13 thereof is shown.

The paper 11 could additionally include an example 14 which shows a practical application of the symbols with the formula. A plurality of rules 15 would likewise be imprinted upon the paper so that a person may attain accuracy in use of the formula.

Additional information and further example 17 may also be contained upon the paper 11 thereby giving the user a full knowledge of how to apply the formula properly. Thus the paper 11 provides complete information so that anyone may use the formula to their advantage. Such paper could be folded transversely as shown at 18 for purpose of convenient storage and it could include struck out arrows 19 upon which text 20 may be imprinted so that a person may quickly find the formula, symbols or rules as shown in the drawing, such as originate at the fold line and themselves do not fold thereby providing an index for the subject matter when the paper 11 is folded over.

It is to be noted that the Kusler formula is applicable to small timber, large timber given in feet and enormously large timber likewise given in feet. The large timbers given in feet may be converted into inches or if preferred may be worked out in feet.

Thus there has been provided a novel formula for the computation to measure lumber, and wherein the formula involves relatively simple mathematics so that any layman may readily use same.

While various changes may be made in the detailed construction it is understood that such changes will be within the spirit and scope of the present invention as is defined by the appended claims.

I claim:

1. A paper for use with a formula for measuring lumber, the formula being imprinted upon said paper, said formula comprising a fraction having a numerator with the numeral "144," said fraction having a denominator with the symbol "ESA," said numerator comprising a mathematical figure, said denominator representing the term "END SURFACE AREA," said fraction followed by an equal sign, and a term after said equal sign, said term comprising the symbol "LI1BF," said term representing the phrase "Length inches one board foot," said formula comprising means wherein the length is gotten for one board foot of lumber by division of the board feet per piece and the total board feet, said paper further including a list of twelve symbols for use with said formula, a set of rules for obtaining accuracy in use of the formula, said information and examples, for attaining correct use of said formula, said paper being folded transversely, a fold formed by said folding, a plurality of arrows struck out in said paper adjacent to said fold, said arrows containing text representing headings to indicate where such formula, symbols and rules are imprinted upon said paper, said paper when folded over having said arrows protruding beyond said fold and serving as indicators for different portions of the text prior to the view thereof, said formula being applicable for lumber measured in inches and lumber measured in feet, and said information imprinted upon said paper indicating how said lumber measured in feet may be converted to inch measurements for application of the formula thereto.

References Cited

UNITED STATES PATENTS 537,391   4/1895   Montgomery _____ 40—124.1
1,411,022   3/1922   Heidenreich _____ 40—124.1

WILLIAM H. GRUB, *Primary Examiner.*